Nov. 12, 1963  K. J. DAVIS  3,110,224
GEAR FINISHING MACHINE
Filed Nov. 27, 1961  3 Sheets-Sheet 1

INVENTOR.
KENNETH J. DAVIS
BY
Whittemore, Hulbert
& Belknap
ATTORNEYS

*INVENTOR.*
KENNETH J. DAVIS

United States Patent Office 3,110,224
Patented Nov. 12, 1963

3,110,224
GEAR FINISHING MACHINE
Kenneth J. Davis, Detroit, Mich., assignor to National Broach & Machine Company, Detroit, Mich., a corporation of Michigan
Filed Nov. 27, 1961, Ser. No. 155,120
5 Claims. (Cl. 90—1.6)

The present invention relates to gear finishing and more particularly to a machine including work gear carrying equipment for effecting loading and unloading of work gears on the machine.

It is an object of the present invention to provide a machine for finishing gears including mechanism for advancing a relatively heavy work gear to the machine and for removing the aforesaid work gear when finished from the machine.

Another object of the present invention is to provide a machine for finishing gears characterized by the manually operable work gear carrier or conveyor which supplies an unfinished gear to the working station of the machine and which removes the aforesaid gear when finished from the working station.

Still another object of the present invention is to provide work gear carrying equipment for a gear finishing machine having a working station including a gear-like finishing tool and a pair of aligned work gear supports which are movable relative to each other about a common axis to engage or release a work gear located at the working station in mesh with the tool, said equipment comprising a gear carrier located on said machine and adapted to traverse said work station, a work gear carrying device having one end pivotally mounted about an axis located adjacent the bottom of said machine and the other end including means which is adapted to carry a work gear, first means connected to said device for swinging the device about its axis toward and away from said carrier, and second means for moving said carrier.

A further object of the present invention is to provide a work gear carrying equipment of the aforementioned type in which the means for swinging the device about its axis includes a fluid actuated motor.

A still further object of the present invention is to provide work gear carrying equipment of the aforementioned type wherein the means for moving the carrier forwardly and backwardly with respect to the pair of work gear supports is manually operable.

A still further object of the present invention is to provide the work gear carrying equipment of the aforementioned type wherein stop means are provided between the machine and the gear carrier for limiting the movement of the gear carrier in the opposite directions.

Another object of the present invention is to provide the work gear carrying equipment of the aforementioned type in which the carrier is in the form of a conveyor or chain which is movable through the work station in a direction substantially perpendicular to the axis of the gear supports.

Still another object of the present invention is to provide the work gear carrying equipment of the aforementioned type wherein the work gear carrying device is mounted at floor level for rotation about an axis which is substantially parallel to the axis of the work gear supports.

A further object of the present invention is to provide work gear carrying equipment of the aforementioned type which is strictly manually operable with the exception of the fluid motor which is provided for swinging the work carrying device about its axis toward and away from the conveyor.

A still further object of the present invention is to provide the work gear carrying equipment of the aforementioned type which is adaptable for handling relatively large gears and wherein the conveyor or chain serves as means for locating the work gear at the working station and as a support for forward and backward movement of the work gear with respect to the gear supports.

A still further object of the present invention is to provide a novel method for supplying an unfinished gear to a machine and removing the finished gear from the machine.

Another object of the present invention is to provide a method of supplying an unfinished relatively large work gear to a gear finishing machine having a work support and a tool support for a gear-like tool which are separated in loading position and removing the work gear when finished from the machine, the method comprising lifting the relatively larger work gear onto a pivotally mounted work gear carrying device, swinging the device about its pivot so as to move the device into juxtaposition with a conveyor mounted on the machine, moving the unfinished work gear from the device onto the conveyor, manually moving the conveyor to a working position intermediate the work support and the tool support and bringing the work gear into mesh engagement with the tool, moving the work support so as to engage the unfinished work gear and keep the unfinished work gear and the tool in mesh engagement, driving the tool so as to finish the work gear, repositioning the work gear when finished on the conveyor, manually moving the conveyor in the opposite direction and reloading the work gear on the device, swinging the device in a direction away from the conevyor, and removing the work gear from the device.

It is thus another object of the present invention to provide a simplified low cost structure and method of the aforementioned types having certain advantages contributing to efficiency, reliability and long life as well as ease of maintenance.

Other objects, advantages and novel details of construction of this invention will be made more apparent as this description proceeds, especially when considered in connection with the accompanying drawings, wherein.

Figure 2:
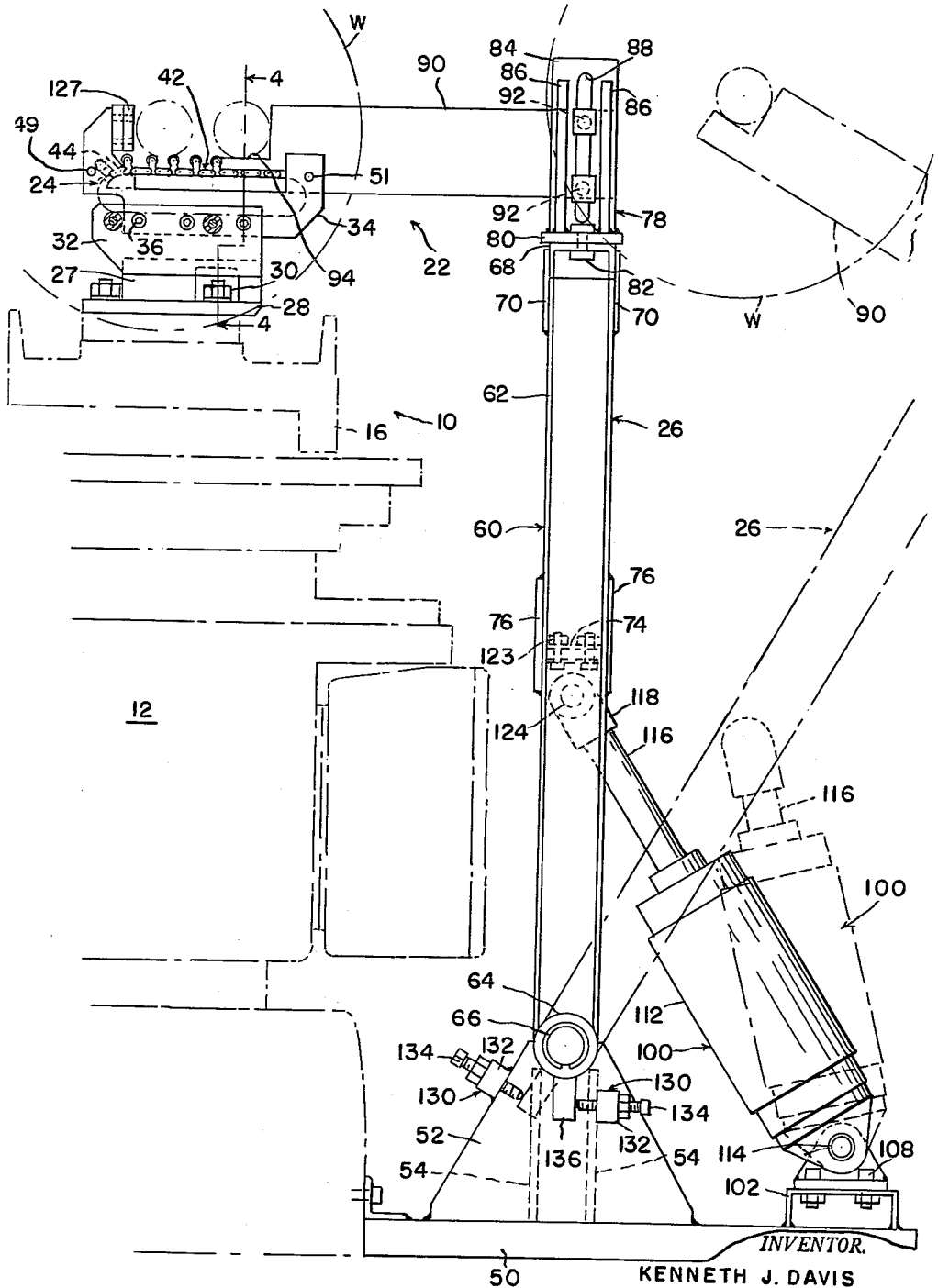
FIGURE 2 is an end view of the present invention showing the gear-finishing machine in dotted lines.

The work gear carrying mechanism or equipment disclosed herein is designed particularly for use with a gear-finishing machine of the type disclosed at 10 in FIGURE 2. A gear-finishing machine of this type comprises a main frame or column 12 including an overhanging portion, not shown, at the front which supports a gear-like finishing tool or cutter 14 for rotation. Suitable means, not shown, is provided for effecting angular adjustment of the tool 14 about a vertical axis and for driving the tool in rotation. A gear-finishing machine of this general type is described in the Kenneth J. Davis' patent, 2,612,080 dated September 30, 1952, entitled "Gear Finishing Machine." This patent is assigned to the assignee of the present application.

Figure 1:
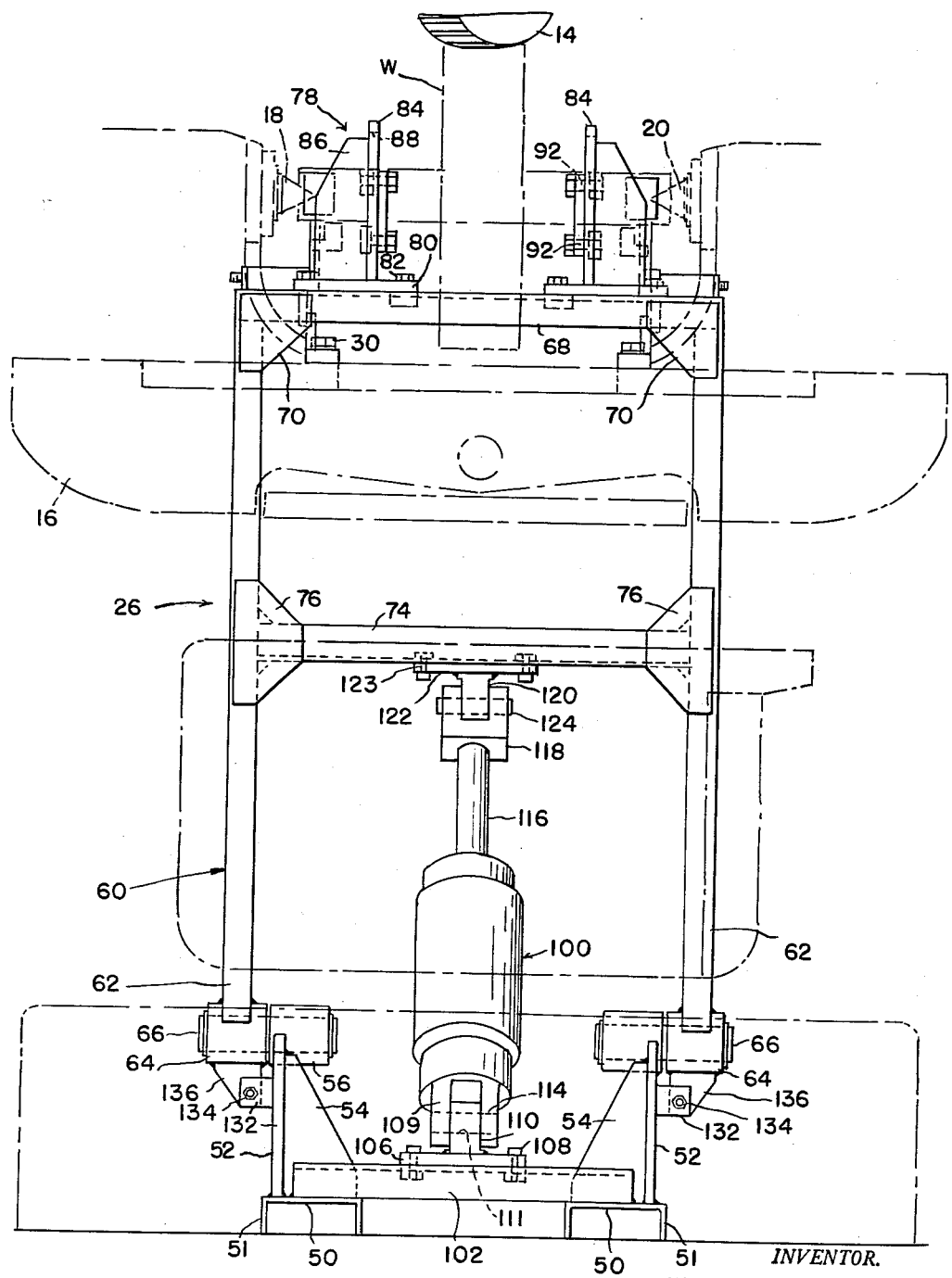
FIGURE 1 is a front elevation of the present invention showing the gear-finishing machine in dotted lines.

The gear-finishing machine 10 includes a vertically adjustable knee, not illustrated, in the table 16 to which is preferably secured a fixture supporting base plate for supporting or carrying centers 18 and 20, or other suitable gear supporting means for supporting a work gear W for rotation in mesh engagement with the tool 14, as illustrated in FIGURE 1. The knee is provided with a pair of horizontal ways. The table 16 is mounted on the ways for back and forth reciprocation. These ways are angularly adjustable about a vertical axis so that reciprocation of the table 16 may take place in any direction in the horizontal plane.

In accordance with the present invention, the mechanism for supporting the tool 14 is adjusted so that the axis of the tool 14 extends generally from front to back of the machine 10 although inclined from such direction by an amount equal to the desired angle between the axis of the work gear W and tool 14 during the finishing operation.

The gear-finishing operation contemplated herein is crossed axis gear finishing in which the work gear W and tool 14 are rotated in mesh with their axes crossed at a relatively small angle, for example, between 3 and 30 degrees, with a relative reciprocation taking place between the gear W and tool 14 in a plane parallel to the axes of both gear and tool and preferably in a direction which makes a substantial angle to the axis of both the work gear W and tool 14.

Figure 3:
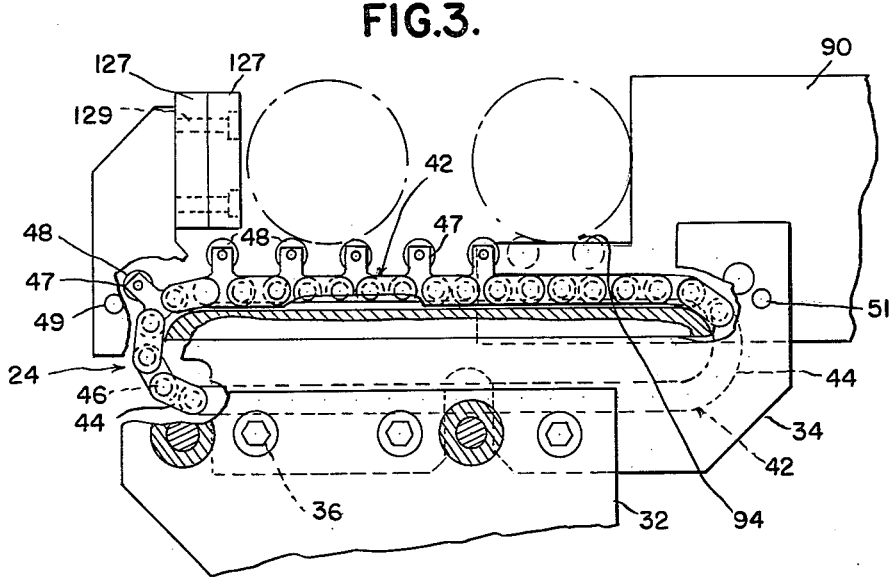
FIGURE 3 is an enlarged view of the conveyor mechanism illustrated in FIGURE 2.
Figure 4:
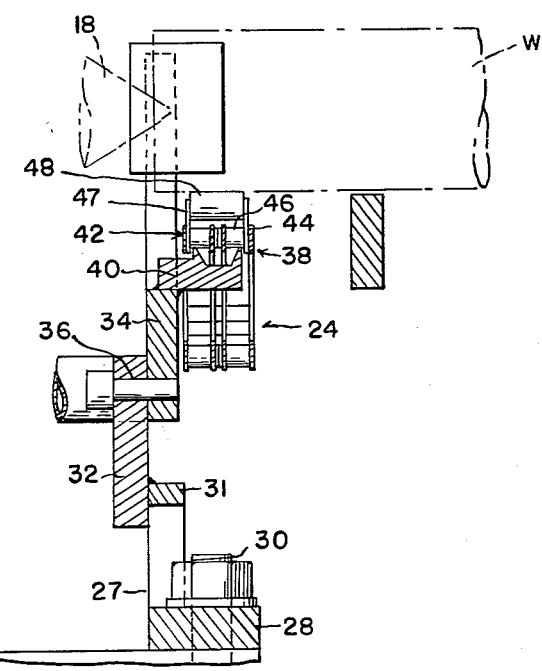
FIGURE 4 is a sectional view taken on line 4—4 of FIGURE 2.

The gear carrying equipment or mechanism 22 comprises a conveying mechanism, conveyor, chain or carrier 24 and a lifting device 26 for loading and unloading the conveying mechanism 24. The conveying mechanism 24 includes a pair of laterally spaced brackets 27 of L-shaped cross section. One leg 28 of the bracket is secured to the top of the table 16 by means of a plurality of fasteners 30. The upstanding leg 31 of each bracket 27 has a side plate 32 secured thereto. The side plate 32 extends upwardly a predetermined distance and is connected to the conveyor support bracket 34 by means of a plurality of bolts 36 or other fastening devices. Each of the conveyor support brackets 34, the shape of which is best illustrated in FIGS. 2 and 3, provides the support for the conveying mechanism 24. The conveying mechanisms 24 are spaced laterally apart and each mechanism 24 includes a rail 40 which is secured to the top edge of the support bracket 34 as is best illustrated in FIGURE 4. The rail 40 includes means for supporting a chain 42 which includes a plurality links 44 which are interconnected by pins 46. The links 44, which constitute the upper strand of the conveyor 24, are provided with roller support arms 47. Each pair of support arms 47 carries a roller 48. Each conveyor 24 is mounted in the manner just described so as to move through the space provided between the centers 18 and 20 at the working station. The amount of movement of the conveyor 24 is limited in the forward and backward directions. Two pairs of stop abutments 49 and 51 are provided on the conveyor support brackets 34. Each abutment is adapted to engage the support arm 47 opposite therefrom to limit the movement of the conveyor 24.

Means are provided for moving a relatively heavy work gear onto the conveyor mechanism 24. A pair of support members 50 of channel-shape cross section are provided. The legs 51 of the members 50 face downwardly so as to engage the floor as is illustrated in FIGURE 1. Each support member 50 carries a bracket 52 which is reinforced by webs 54. Each bracket 52 is provided with a cylindrical bearing 56. A swinging channel-shaped frame 60, constituting a part of the lifting device 26, is pivotally interconnected to the bearings 56. The frame 60 includes a pair of elongated side members 62 of channel-shaped cross-section, the lower ends of which are provided with bearings 64. A pivot pin 66 extends through the bearings 64 and 56 and permits the frame 60 to be rotated with respect to the brackets 52. The upper ends of the side members 62 are connected by a laterally extending brace 68. Gusset plates 70 reinforce the connection between the brace 68 and the side members 62. The frame 60 is provided with a transversely extending brace 74 near the mid-point thereof. The brace 74 is connected to the side members 62 by gusset plates 76.

The brace 68, which is of channel-shape construction, has a relatively smooth top surface. Mounted on top of the brace 68 are a pair of gear carrying assemblies 78 which are of identical construction. Each assembly 78 includes a plate 80 which is connected to the brace 68 by means of bolts 82. A bracket 84 extends upwardly from the plate 80 and is reinforced by webs 86. The bracket 84 is provided with an elongated slot 88 as is best illustrated in FIG. 2. A gear support arm 90 is carried by the bracket 84 and is connected thereto by means of a pair of fasteners 92. The other end of the gear support arm 90 is reduced in thickness as indicated at 94 and provides the support for carrying one of the arbors of the work gear W.

A fluid motor 100 comprising a cylinder and piston is interconnected between the motor base 102, which spans the support members 50, and the brace 74. A plate 106 is connected to the motor base 102 by means of bolts 108 and is provided with an upstanding flange 110 which has a cylindrical bearing opening 111 therethrough. A clevis 109 is provided on the cylinder end of the fluid motor 100. The flange 110 is connected to the clevis 109 by means of a pivot pin 114. A piston, not illustrated, is movable in the cylinder 112 and is connected to the piston rod 116. The rod 116 is provided with a clevis 118 which is connected to the flange 120 of a bracket 122 by means of a pivot pin 124. The bracket 122 is connected to the brace 74 by bolts 123.

The fluid motor or mechanism 100 is connected to a hydraulic or pneumatic source or to other actuating means and is adapted, upon the application of a proper signal, to move the piston provided in the cylinder 112 in a direction so as to move the frame 60 toward or away from the conveyor mechanism 24.

In operation, when it is desirable to finish a relatively large work gear W, a chain fall or other lifting mechanism, not shown, lifts the relatively large gear onto the two gear support arms 90 as is illustrated by the dotted lines in FIG. 2. Subsequently the fluid motor 100 is actuated so as to swing the frame 60 towards the gear finishing machine 10 into the position represented by the solid lines in FIG. 2. After this position has been reached, the operator takes hold of the gear and moves it onto the conveyor 24. The operator then manually moves the work gear and the conveyor 24 to the left in the forward direction as viewed in FIG. 2 so as to position the arbors of the work gear W between the centers 18 and 20 and in mesh with the tool 14. The arbors of the work gear W are moved against the fibrous bumpers 127, which are carried by the conveyor support brackets 34, so as to cushion the movement of the work gear W when moved in the forward direction. When the work gear is in the position just mentioned, the centers 18 and 20 are moved toward each other so as to pick up the ends of the work gear, keeping the work gear W in mesh with the tool 14 with their axes crossed as illustrated in FIG. 1. At this point cylinder 100 is preferably actuated to swing frame 60 away from the machine to permit closing of the table guard, although in some cases frame 60 may be left in position to receive the finished gear.

The work gear and tool 14 are rotated in mesh as is described in the Davis patent so as to finish the work gear. After the work gear has been finished, a reverse operation takes place. In other words, the centers 18 and 20 are moved apart so as to again place the work gear on the conveyor 24. The operator in turn moves the work gear and the conveyor 24 to the right so as to reposition the work gear W on the gear support arms 90. Later the gear carrying frame 60 is swung in the direction away from the conveyor 24, due to the actuation of the fluid motor, to the position illustrated in dotted lines in FIGURE 2. Subsequently a chain fall, not shown, is used to lift the finished work gear W from the gear support arms 90.

Each bracket 52 is provided with a pair of stop abutments 130 as best illustrated in FIG. 1. The stop abutments 130 include a flange or bracket 132 and an adjustment screw or member 134. The screws 134 are moved to a predetermined position with reference to the frame 60 so as to limit the movement of the frame in the forward and backward directions. A finger 136 is carried by the bearing 64 and is adapted to engage the screws 134 for limiting the swinging movement of the frame 60 in the forward and backward directions.

Except where specifically stated, the parts or components are preferably connected by a welding operation. The bumpers 127 are made from a fibrous material and are connected to the support brackets by bolts 129. The stop abutments 49 and 51 may take the form of dowel pins which are carried by the conveyor support brackets 34.

The drawings and the foregoing specification constitute a description of the improved mechanism for gear finishing machine in such full, clear, concise and exact terms as to enable any person skilled in the art to practice the invention, the scope of which is indicated by the appended claims.

What I claim as my invention is:

1. Work gear carrying equipment for a gear finishing machine having a working station including a gear-like finishing tool and a pair of aligned work gear supports which are movable relative to each other along a common axis to engage or release a work gear in mesh with the tool, said equipment comprising a pair of laterally spaced conveyor supports mounted on said machine, manually operable link conveyors mounted on said conveyor supports and extending from the front of the machine towards the rear thereof, the upper portion of each of said link conveyors including a plurality of upstanding support arms between adjacent links, with an adjacent pair of said support arms on each of the conveyors adapted to support one of the arbors of the work gear, with the toothed portion of the work gear being received in the space between said link conveyors, a work gear carrying device at the front side of the machine, said device being movable in a vertical plane and including an elongated frame having the lower end thereof pivoted about an axis located closely adjacent the bottom of the machine and a pair of elongated arms carried by the upper end of said frame and arranged substantially perpendicular thereto, said arms being spaced apart and adapted to carry the arbors of the work gear, with the toothed portion of the work gear in the space between said arms, a motor support adjacent the bottom of the machine, and a fluid motor operatively connected between said frame and said motor support for swinging said device about its axis in a vertical plane toward and away from said link conveyors, said frame when in a vertical position having the arms thereon substantially horizontal adjacent said conveyors so that a work gear thereon may be moved onto said link conveyors.

2. The structure defined in claim 1 wherein stop abutment means are provided on said conveyor supports at opposite ends thereof which are engageable with the opposite support arms on the conveyors for limiting the movement thereof in opposite directions.

3. The structure defined in claim 1 wherein stop abutment means are provided adjacent the pivot axis of said device and engageable with said device for limiting the movement of said device toward and away from said conveyors.

4. The structure defined in claim 1 wherein each of said conveyor supports is provided with a bumper which is engageable with an arbor of the work gear at the working station for locating the work gear between the work gear supports.

5. The structure defined in claim 1 wherein said arms are adjustably carried by said frame.

References Cited in the file of this patent

UNITED STATES PATENTS

| | | |
|---|---|---|
| 2,612,080 | Davis | Sept. 30, 1952 |
| 2,802,381 | Leasia | Aug. 13, 1957 |
| 2,835,372 | Biddison | May 20, 1958 |